(12) United States Patent
Saka et al.

(10) Patent No.: US 7,460,806 B2
(45) Date of Patent: Dec. 2, 2008

(54) JOB EXECUTION SYSTEM AND JOB EXECUTION METHOD, AND JOB EXECUTION APPARATUS AND IMAGE FORMING APPARATUS USED FOR THIS SYSTEM

(75) Inventors: Masaaki Saka, Toyokawa (JP); Hiroshi Iwamoto, Toyohashi (JP); Shoji Imaizumi, Shinshiro (JP); Eiichi Yoshida, Toyokawa (JP); Hideki Hino, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 11/012,323

(22) Filed: Dec. 16, 2004

(65) Prior Publication Data

US 2006/0062588 A1 Mar. 23, 2006

(30) Foreign Application Priority Data

Sep. 17, 2004 (JP) ............................ 2004-272329

(51) Int. Cl.
*G03G 15/00* (2006.01)
(52) U.S. Cl. .......................................... 399/80; 399/82
(58) Field of Classification Search ................. 399/80, 399/82
See application file for complete search history.

(56) References Cited

U.S. PATENT DOCUMENTS

| | | | | |
|---|---|---|---|---|
| 5,832,339 A | * | 11/1998 | Inui et al. | 399/83 |
| 5,999,766 A | * | 12/1999 | Hisatomi et al. | 399/80 |
| 6,151,464 A | * | 11/2000 | Nakamura et al. | 399/79 |
| 6,181,893 B1 | * | 1/2001 | Collard et al. | 399/80 |
| 6,507,716 B2 | * | 1/2003 | Nomura et al. | 399/80 |
| 6,694,115 B2 | * | 2/2004 | Weaver | 399/80 |

FOREIGN PATENT DOCUMENTS

| | | | |
|---|---|---|---|
| JP | 3-194564 | A | 8/1991 |
| JP | 6-11925 | A | 1/1994 |
| JP | 10-254301 | | 9/1998 |
| JP | 11-242571 | | 9/1999 |
| JP | 2002-041910 | | 2/2002 |
| JP | 2002-109456 | | 4/2002 |
| JP | 2002-149636 | A | 5/2002 |
| JP | 2004-185079 | A | 7/2004 |

OTHER PUBLICATIONS

Machine translation of JP 2002-149636 previously cited by Applicants in their information disclosure statement dated Dec. 11, 2006.*
Japanese Office Action issue Jun. 6, 2006 in JP 2004-272329, with English translation.
A Decision of Refusal issued in corresponding Japanese Patent Application No. 2004-272329, and translation thereof.

* cited by examiner

*Primary Examiner*—David M Gray
*Assistant Examiner*—Bryan Ready
(74) *Attorney, Agent, or Firm*—Buchanan Ingersoll & Rooney PC (57) ABSTRACT

A job execution system comprises a job execution apparatus, a mode storage portion which stores mode control information that indicates the relationship between a user and a job execution mode of a group to which the user belongs, and a mode identification portion which identifies the job execution mode of the group to which the user belongs in accordance with the user information entered by the user and the mode control information. Furthermore, the job execution apparatus is equipped with a job execution portion which executes the job and a controller which allows the job execution portion to execute the job directed by the user for execution in a job execution mode identified by the mode identification portion.

22 Claims, 9 Drawing Sheets

Before authentication

FIG.4A

Successful authentication

FIG.4B

Authentication failed

FIG.4C

| Group | Group mode (print mode) |
|---|---|
| Group A | Paper feeder slit first step, both sides, 1 in 1, two punch holes |
| Group B | Paper feeder slit second step, both sides, 2 in 1, corner staple |
| Group C | Paper feeder slit first step, single side, 2 in 1, two punch holes, corner staple |

FIG.5A

| User | User mode (print mode) |
|---|---|
| User 1 | Paper feeder slit third step, single side, 2 in 1, no finishing |
| User 2 | Paper feeder slit second step, single side, 1 in 1, no finishing |
| User 3 | Paper feeder slit second step, both sides, 1 in 1, no finishing |
| User 4 | Paper feeder slit third step, both sides, 2 in 1, corner staple |

FIG.5B

| User | Group | Choice | Job execution mode (print mode) |
|---|---|---|---|
| User 1 | Group A | Group | Paper feeder slit first step, both sides, 1 in 1, two punch holes |
| User 2 | Group B | Group | Paper feeder slit second step, both sides, 2 in 1, corner staple |
| User 3 | Group B | User | Paper feeder slit second step, both sides, 1 in 1, no finishing |
| User 4 | Group C | User | Paper feeder slit third step, both sides, 2 in 1, corner staple |

| User | Priority | Choice | Job execution mode (print mode) |
|---|---|---|---|
| User 1 (Group B) | A : Highest important | User | Paper feeder slit first step, single side, 1in1, no finishing |
| | B : Important | Group | Paper feeder slit second step, both sides, 2in1, corner staple |
| | C : Regular | Group | Paper feeder slit second step, both sides, 2in1, corner staple |

JOB EXECUTION SYSTEM AND JOB EXECUTION METHOD, AND JOB EXECUTION APPARATUS AND IMAGE FORMING APPARATUS USED FOR THIS SYSTEM

This application claims priority under 35 U.S.C.§119 to Japanese Patent Application No. P2004-272329 filed on Sep. 17, 2004, the entire disclosure of which is incorporated herein by reference in its entirety.

BACKGROUND OF THE INVENTION

1. Field of the Invention

The present invention relates to a job execution system which executes a job directed by a user in accordance with the job execution mode of the group to which the user belongs as well as to a job execution apparatus and an image forming apparatus used for this system.

2. Description of Related Art

The following description sets forth the inventor's knowledge of related art and problems therein and should not be construed as an admission of knowledge in the prior art.

When a job is executed by the job execution apparatus such as an image forming apparatus and others, as before, the user must enter the job execution mode (operating conditions). However, it is troublesome to enter the execution mode every time a job is executed.

Therefore, in Japanese Unexamined Patent Publication No. Hei 10-254301, there proposed is the image forming apparatus which simplifies entry operation of the job execution mode by alterably storing multiple job execution modes in memory, and selecting one from the multiple job execution modes when the job is executed and allowing the apparatus to execute the job.

Now, recently, from the viewpoint of ensuring security and others, the use condition of the job execution apparatus is frequently controlled in accord with the group to which the user belongs. In addition, jobs are frequently executed in the job execution mode designated to each group.

Therefore, in the image forming apparatus stipulated in Japanese Unexamined Patent Publication No. Hei 10-254301, the job execution mode is stored in memory in accord with groups, and when the user who belongs to the group allows apparatus to execute the job in the job execution mode of the group, it is assumed that the entry operation of job execution mode can be simplified by selecting the mode stored.

However, in such case, for the user, the operation to select the job execution mode is necessary, and consequently, the user must remember the group to which the user belongs, and it is just the same troublesome. In the event that the affiliate group is changed, it is still more troublesome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a job execution system which does not need entry operation or selection operation for the job execution mode or the user affiliate group when a job is executed by the job execution mode of a group to which the user belongs.

Among other potential advantages, some embodiments can provide a job execution method which does not need any entry operation or selection operation for the job execution mode or the user affiliate group when the job is executed by the job execution mode of the group to which the user belongs.

Among other potential advantages, some embodiments can provide a job execution apparatus which is used for the above job execution system.

Among other potential advantages, some embodiments can provide an image forming apparatus which is used for the above job execution system.

According to a first aspect of a preferred embodiment of the present invention, a job execution system, comprises:
  a job execution apparatus,
  a mode storage portion which is installed outside or inside of the job execution apparatus and stores mode control information that indicates a relationship between a user and a job execution mode of a group to which the user belongs; and
  a mode identification portion which is installed outside or inside the job execution apparatus and identifies the job execution mode of the group to which the user belongs based on user information entered by the user and the mode control information,
  wherein the job execution apparatus is equipped with a job execution portion which executes the job, and
  a controller which allows the job execution portion to execute the job directed by the user for execution in the job execution mode identified by the mode identification portion.

According to a second aspect of a preferred embodiment of the present invention, a job execution method, comprises steps of:
  receiving user information entered by a user,
  identifying a job execution mode of a group to which the user belongs in accordance with mode control information that indicates a relationship between the user and the job execution mode of the group to which the user belongs and the user information entered by the user, and
  allowing a job execution apparatus to execute a job directed by the user for execution in the identified job execution mode.

According to a third aspect of a preferred embodiment of the present invention, a job execution apparatus, comprises:
  a mode identification portion which identifies a job execution mode of a group to which a user belongs in accordance with mode control information which indicates a relationship between the user and the job execution mode of the group to which the user belongs and user information entered by the user,
  a job execution portion which executes a job, and
  a controller which allows the job execution portion to execute the job directed by the user for execution in the job execution mode identified by the mode identification portion.

According to a fourth aspect of a preferred embodiment of the present invention, an image forming apparatus, comprises:

a mode identification portion which identifies a job execution mode of a group to which a user belongs in accordance with mode control information which indicates a relationship between the user and the job execution mode of the group to which the user belongs and user information entered by the user;

a job execution portion which executes a job; and a controller which allows the job execution portion to execute the job directed by the user for execution in the job execution mode identified by the mode identification portion.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 7 is a block diagram which summarizes how the system shown in FIG. 1 and FIG. 2 is used;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
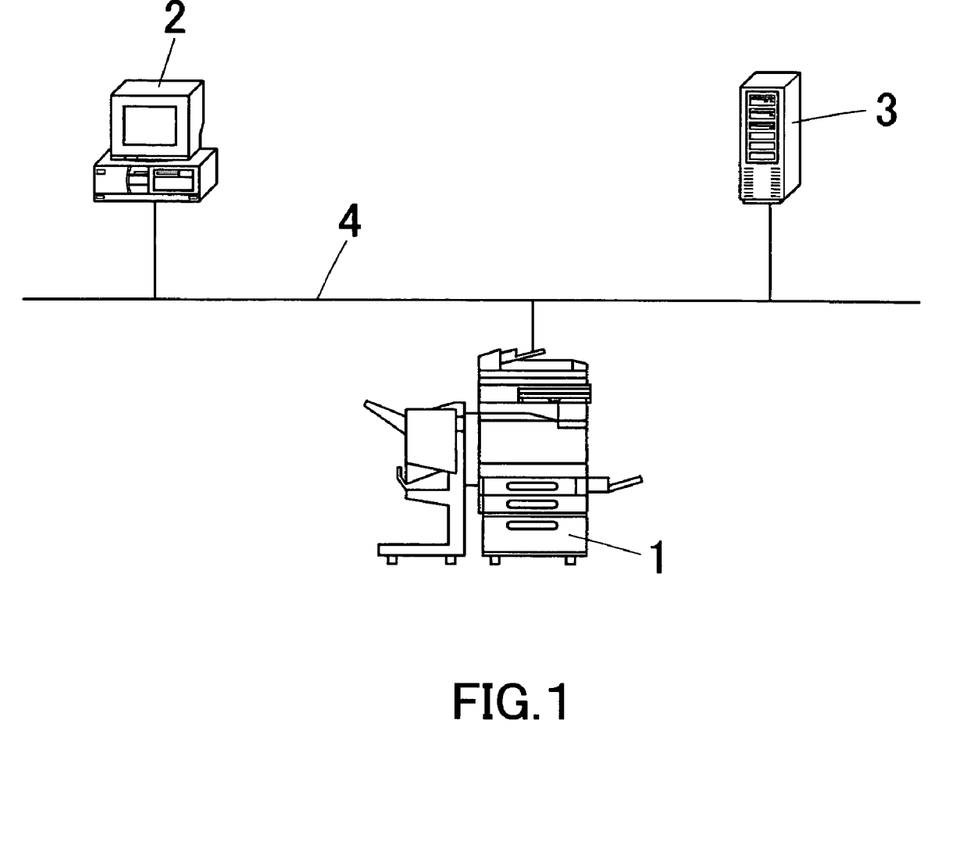
FIG. 1 is a configuration diagram of one embodiment of the job execution system according to the present invention.

FIG. 1 is a configuration diagram of one embodiment of the job execution system according to the present invention.

In the system of FIG. 1, reference numeral 1 denotes MFP as an image forming apparatus which is a job execution apparatus, reference numeral 2 a user terminal comprising a personal computer and others, reference numeral 3 an authentication server installed outside MFP1, and these MFP1, user terminal 2, and authentication server 3 are connected via the network 4.

Figure 2:
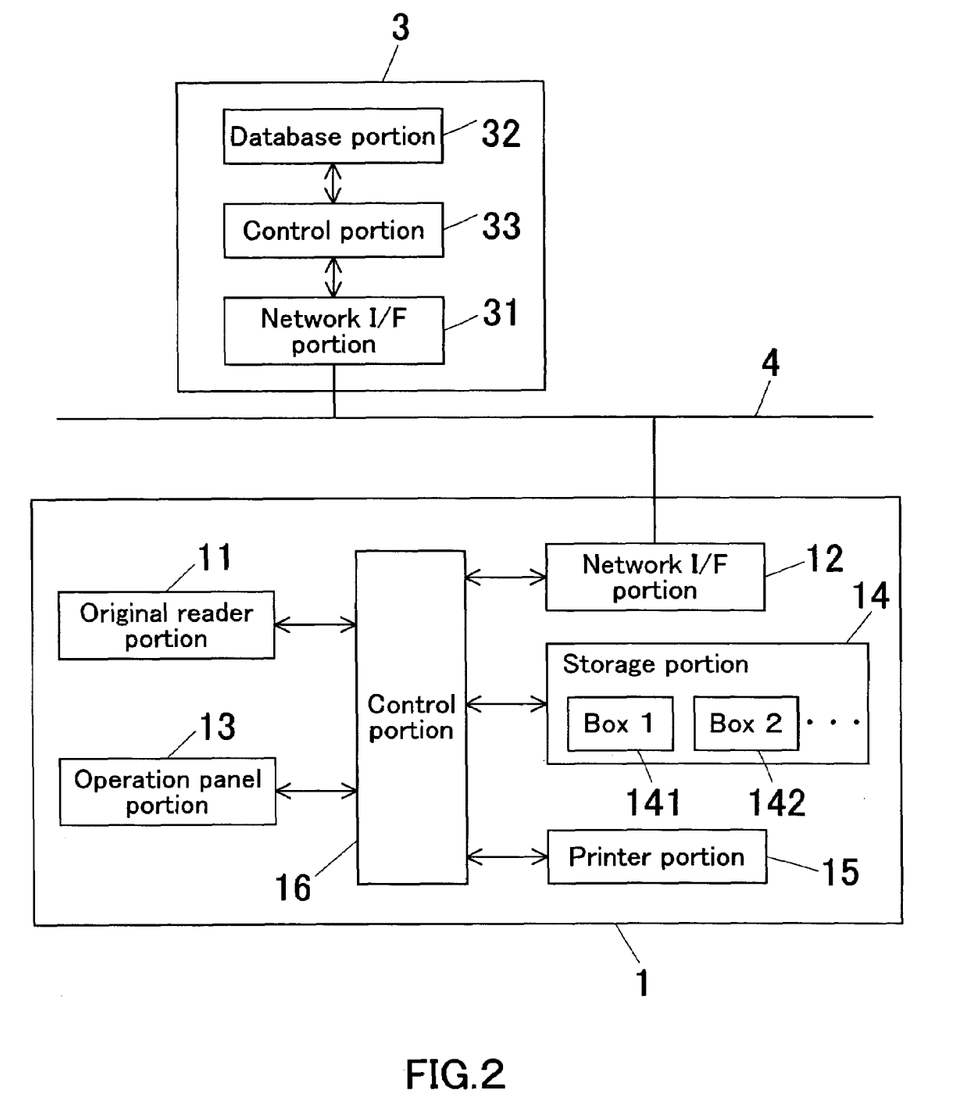
FIG. 2 is a block diagram illustrating the general configuration of the MFP (multi function peripherals) and an authentication server in FIG. 1.

FIG. 2 is a general configuration of the MFP1 and the authentication server 3. The MFP1 comprises an original reader portion 11, network interface portion (called a network I/F portion in the drawing) 12, operation panel portion 13, storage portion 14, printer portion 15, and controller 16.

The original reader portion 11 reads images of a copy placed on a platen glass (not illustrated) and sends image data.

The network interface portion 12 functions as a transmitter/receiver portion that carries out data transmission and reception between the user terminal 2, authentication server 3, and other external apparatus.

The operation panel portion 13 has a touch-panel display portion comprising a mode setting key, start button, ten-key pad and other various operating keys, LCD, and others, and is operated when the MFP1 is used or when the mode is set.

The storage portion 14 is nonvolatile storage in which the information is retained even when the apparatus power supply is turned off, and for example, a harddisk is used. This storage portion 14 has a region of multiple boxes 141, 142, . . . that comprise folders. And to each of boxes 141, 142, . . . , various files including image data of originals read by the original reader portion 11, image data sent from the user terminal 2, and others. In addition, each box 141, box 142, . . . are controlled by the specified group to which each user belongs.

The printer portion 15 prints image data of originals read by the original reader portion 11 and print data transmitted from the user terminal 2, as well as image data stored in the box, and functions as the job execution portion.

The controller 16 includes CPU, ROM, RAM and controls the whole operation of the MFP1. Specifically, the controller allows the original reader portion 11 to read the original image in accordance with the user start instructions and to store the read image data in box 1, box 2, . . . , identifies the job execution mode as later discussed and allows the printer portion 15 to print the image data on the paper in the job execution mode established in accord with groups or in the job execution mode established in accord with users, or an external apparatus to deliver the data via network interface portion 12. In addition, in the event that authentication data for user authentication is entered from the user terminal 2 or the operation panel portion 13 in using the MFP1, the controller transmits the data to the authentication server 3 and executes the authentication, and at the same time, judges the adequacy of the job execution in accordance with the authentication results from the authentication server 3.

The authentication server 3 comprises a network interface portion (called a network I/F portion in the drawing) 31, database portion 32, and controller 33.

The network interface portion 31 functions as a transmission-reception portion to transmit and receive data between the MFP1, the user terminal 2, and other external apparatus.

The database portion 32 is of a nonvolatile type which stores the information even when the apparatus power supply is turned off, and for example, a harddisk is used. In this database portion 32, user ID, password, user authority information, and other authentication information necessary for authentication are stored, in addition to the mode control information for controlling the job execution mode. Specifically, the user and the group to which the user belongs, and the job execution mode established for the group (hereinafter called the "group mode") are stored in association with each other, and furthermore, the job execution mode established for each user (hereinafter called the "user mode") and the information as to which should be selected, group mode or user mode, and others are stored. This will be described later more in detail.

The controller 33 controls the whole authentication server 3. For example, it carries out authentication in accordance with the data entered by the user to the MFP1 and transmitted from the MFP1, and transmits the result and necessary mode control information to the MFP1, or when a request to change the user affiliate group is made, etc., the controller 33 carries out processing accordingly.

Figure 3:
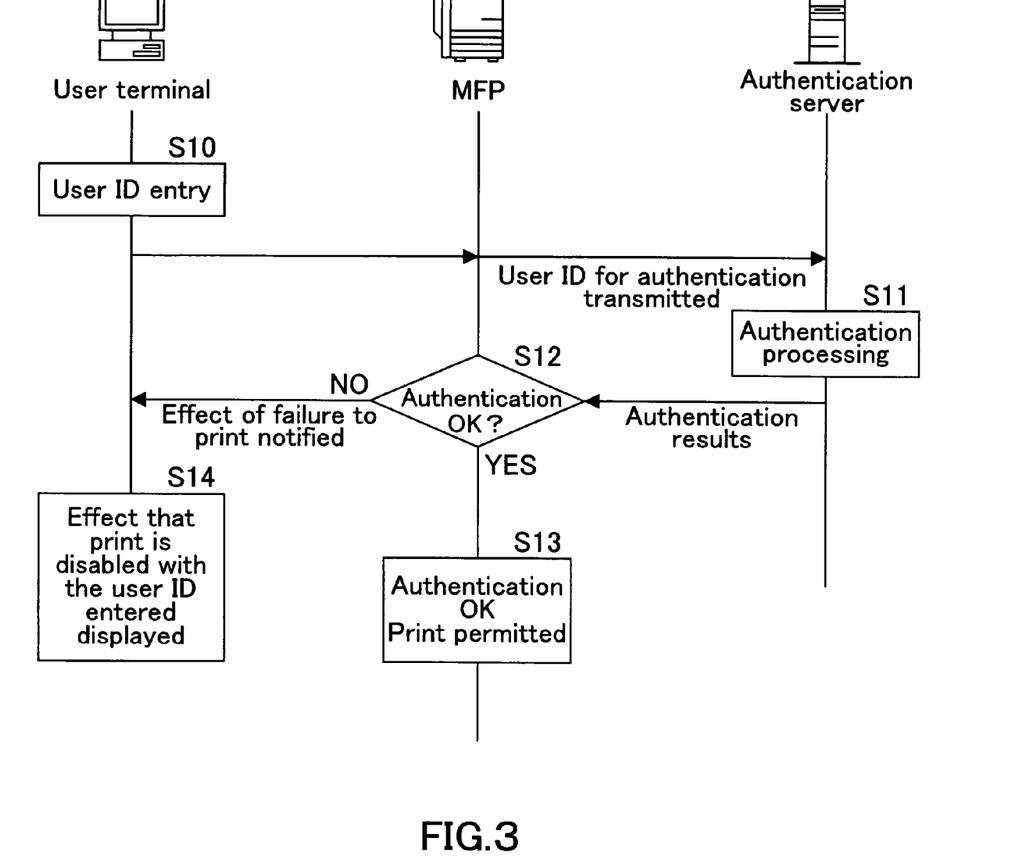
FIG. 3 is a flow chart illustrating a flow of data among the user terminal, the MFP, and the authentication server.

FIG. 3 is a flow chart indicating the procedure when user authentication is carried out. In the following explanation and drawings, the step is abbreviated to "S." In addition, in the following description, the case in which the job instructed by the user is the print job is shown.

Figure 4A:
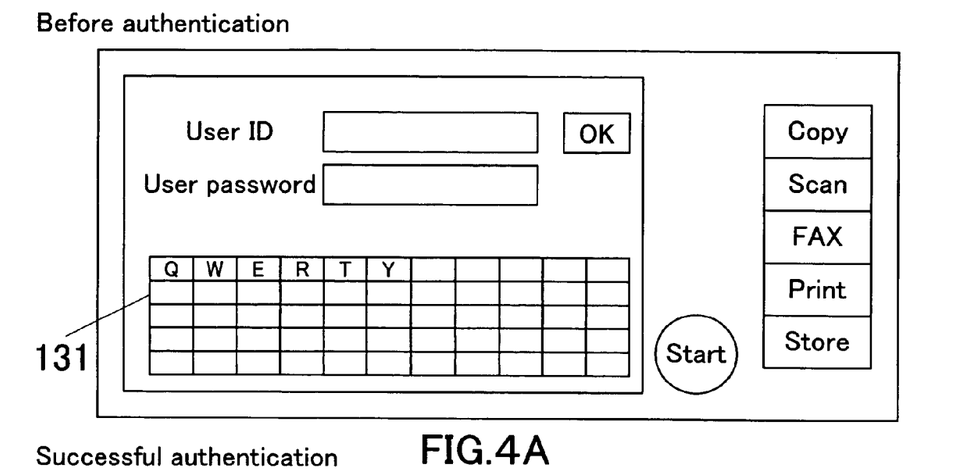
FIG. 4A is an entry screen of user ID and password.

The user enters the user ID and password from the user terminal 2 or MFP1 operation panel portion 13 (S10). FIG. 4A shows the input screen when the data is entered from the operation panel portion 13. The user enters the user ID and password from the keyboard display portion 131.

Returned to the FIG. 3 the user ID entered in the MFP1 is transmitted to the authentication server 3. The authentication server 3 collates the transmitted the user ID, the password, and others with the authentication information stored in the database portion 32, executes authentication processing (S11), and transmits the authentication results and the necessary mode control information to the MFP1.

Figure 4B:
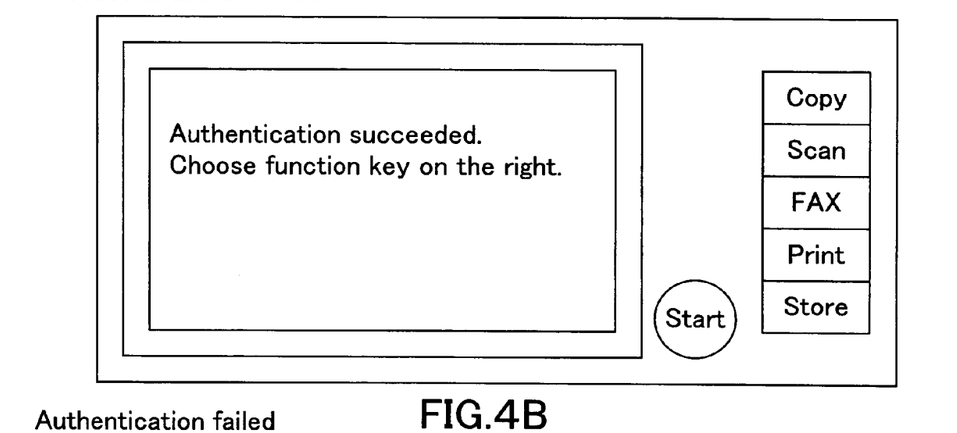
FIG. 4B is a screen at the successful authentication.

In the MFP1, whether or not the authentication was successful (S12) is judged based on the authentication results and if the authentication is successful (YES for judgment in the S12), execution of the printing is permitted (S13). FIG. 4B shows the display screen of the operation panel portion 13 in such event.

Figure 4C:
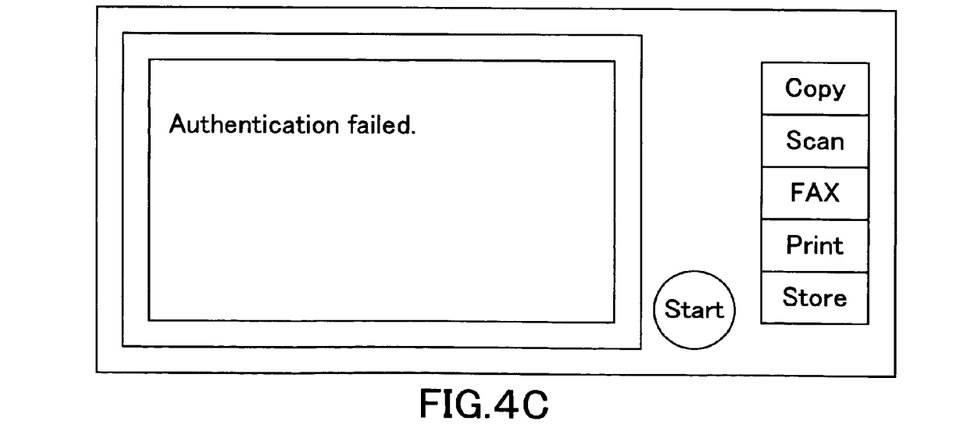
FIG. 4C is a screen when authentication fails.

If the authentication fails (NO for judgment in the S12 of FIG. 3), the effect that the printing is disabled is transmitted to the user terminal 2 and the effect is displayed on the display portion (S14) or the effect that the authentication failed is displayed on the operation panel portion 13 if the user ID is entered from the operation panel portion 13 of the MFP1. FIG. 4C shows the display screen of the operation panel portion 13 in such event.

Figure 5A:
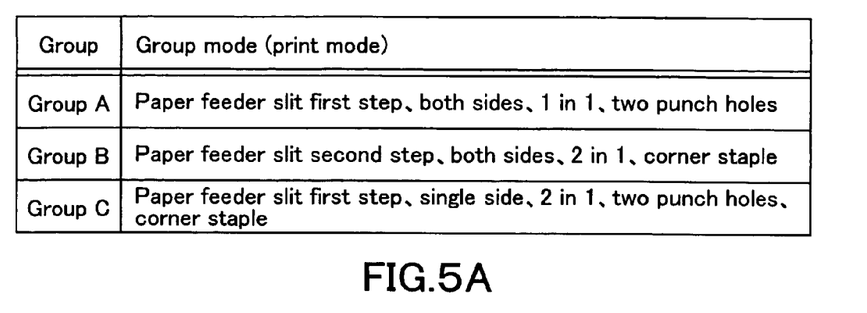
FIG. 5 is an illustration indicating the content of control information stored in the database of the authentication server.
Figure 5B:
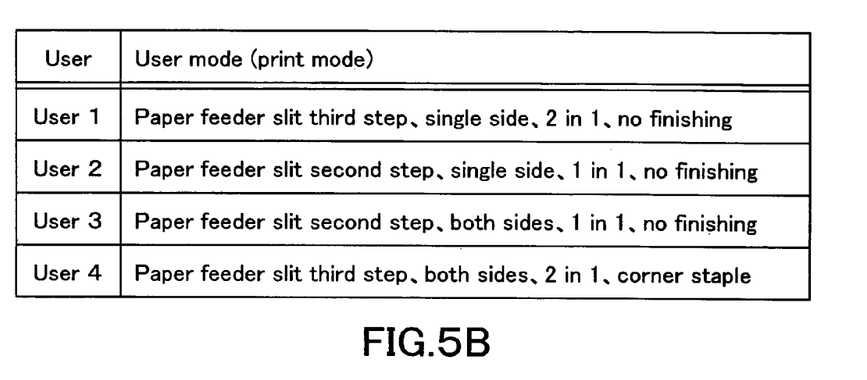
Figure 5C:
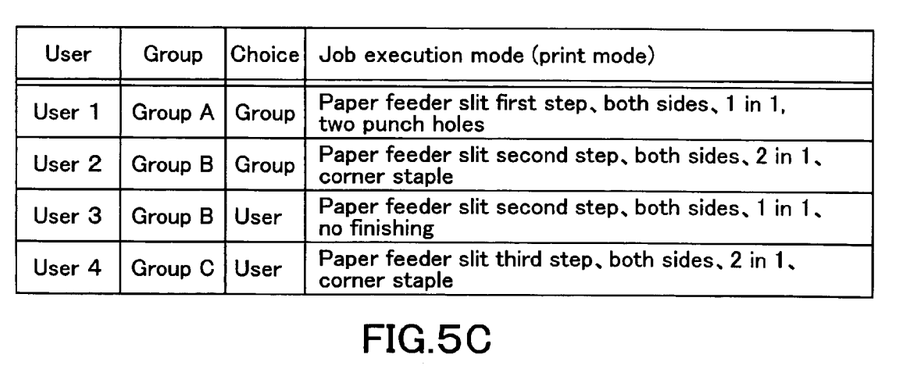

FIG. 5 indicates the mode control information stored in the database portion 32 of the authentication server 3 discussed above. FIG. 5A is a table that indicates the content of the group mode (the print mode in the present embodiment) established in accord with Group A through C to which the user belongs, while FIG. 5B is a table that indicates the content of the user mode established in accord with users. FIG. 5C is a table that indicates the relationship between the user and the job execution mode, and in this embodiment, as shown in the "Choice" item, it is allowed to select whether to adopt the group mode or the user mode in executing the job. In the example shown in FIG. 5C, for users 1, 2 with "Group" stipulated, it is set to adopt the group mode shown in FIG. 5A and for users 3, 4, it is set to adopt the user mode shown in FIG. 5B.

Figure 6:
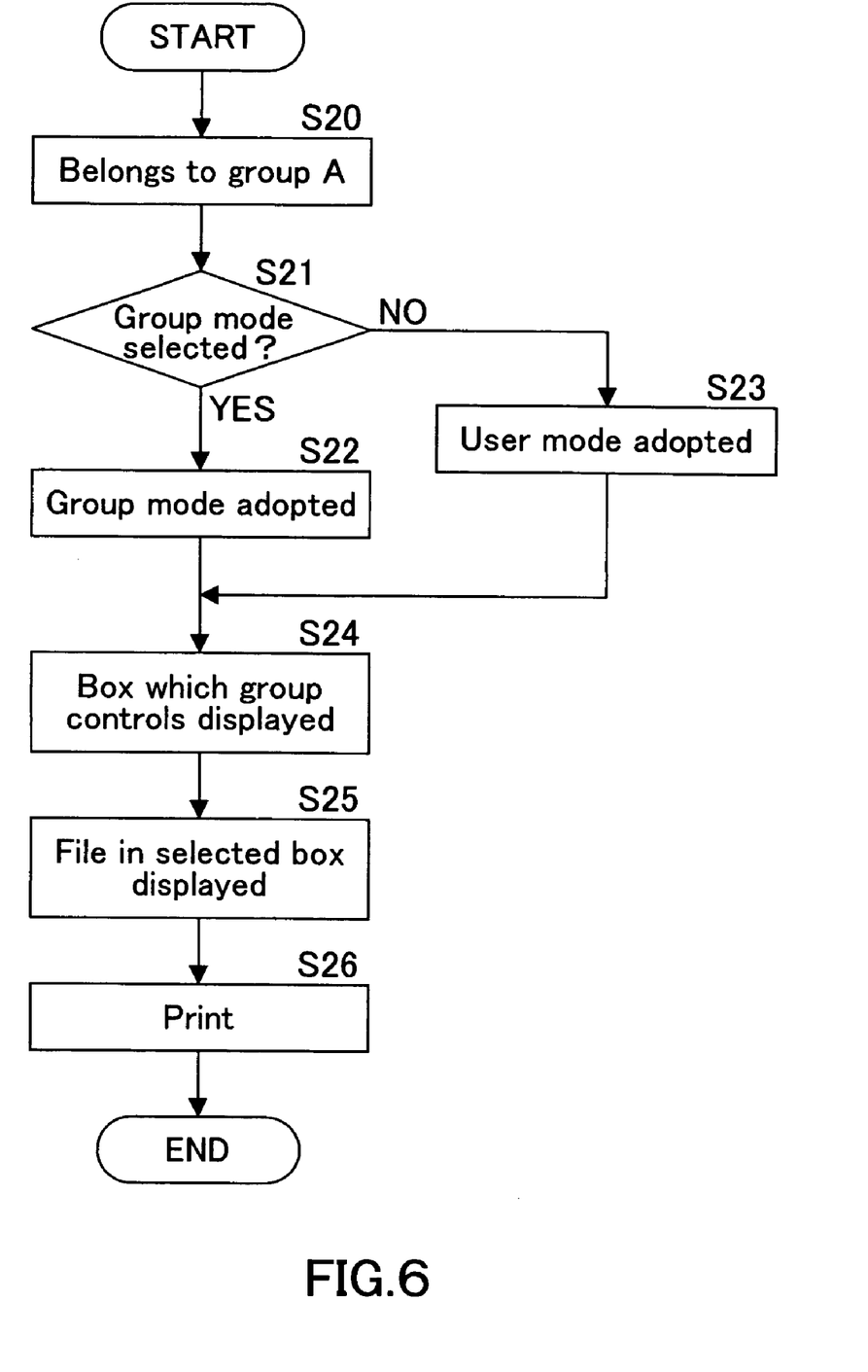
FIG. 6 is a flow chart illustrating the content of job execution processing which the MFP controller carries out.

FIG. 6 is a flow chart that indicates the content of the job execution processing to be carried out by the controller 16 of the MFP1 which receives the notice from the authentication server 3 to the effect that the authentication is successful.

In S20, when it is judged that the user belongs to, for example, Group A by the mode control information of FIG. 5C transmitted from the authentication server 3, whether the group mode of the affiliate group A or the user mode has been selected is judged from the "Choice" item in S21.

In the S21, if the group mode is selected (YES for judgment in the S21), the group mode of Group A is adopted in S22, and if the user mode is selected (NO for judgment in the S21), the user mode for the user is adopted in S23. By this, the job execution mode is identified.

Then, in S24, the box which Group A to which the user belongs controls is displayed on the user terminal 2 or the operation panel portion 13. When the user selects a desired box, in S25, the file in the selected box is displayed.

When the user selects a desired file in the files displayed in S26, the controller 16 allows the printer portion 15 to print the file either in the group mode or in the user mode and completes the job execution processing.

As understood from this description, the user has no need to enter the job execution mode specifically or need to enter the group name to which the user belongs or others, and entering the user ID and/or the password automatically identifies the user affiliate group stored in the database portion 32 of the authentication server 3 in association with the user, and furthermore identifies the group mode.

Consequently, the user operation can be simplified. Furthermore, in this embodiment, since the group mode and the user mode can be selected and established, the job execution that supports the user conditions can be achieved.

By the way, the group mode and the user mode may be selected in advance as is the case of the present embodiment or the user may be allowed to select the mode by displaying a selection screen on the user terminal 2 or the operation panel portion 13 in executing the job.

Figure 7:
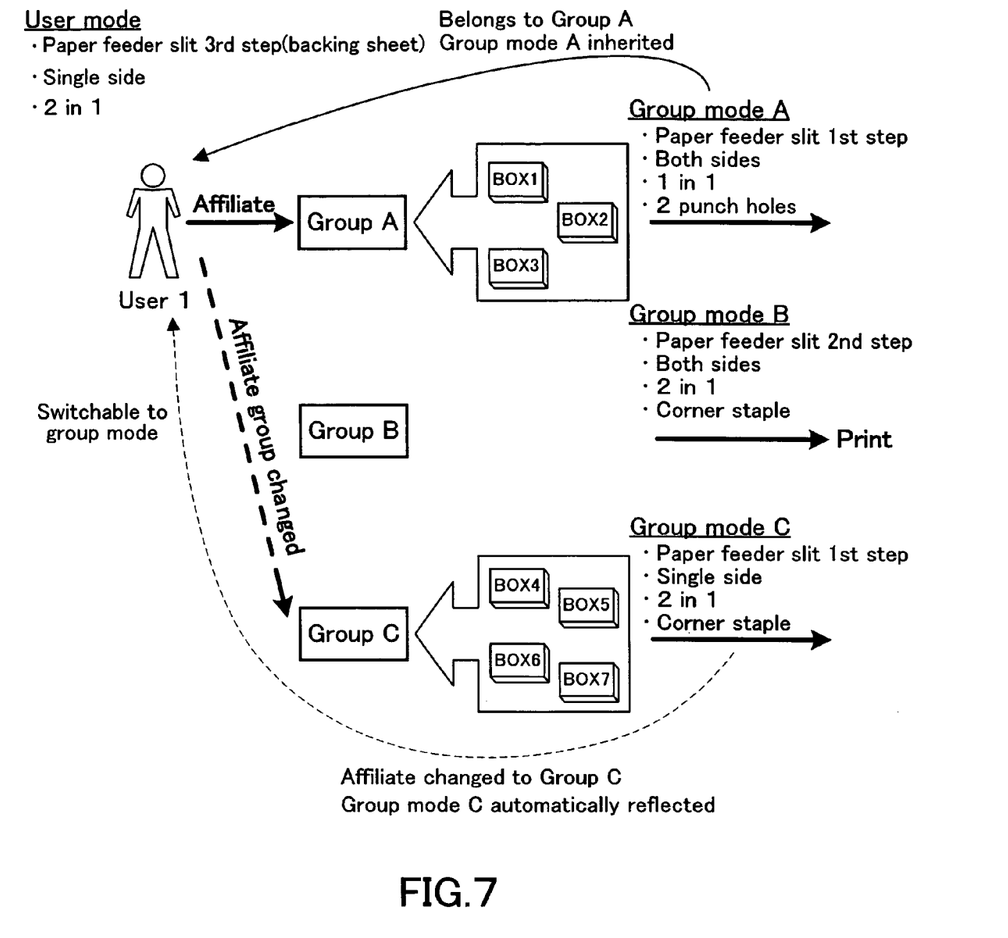

FIG. 7 is a block diagram which summarizes how the system shown in FIGS. 1 and 2 is used.

Now assume that the authenticated user 1 belongs to the Group A. In such event, the user 1 can select the group mode established in accord with affiliate groups and the user mode established in accord with users as described above.

In the event that the jobs for boxes 1 through 3 which the Group A controls are established to execute in the group mode, the job is executed in the Group A mode. In the event that the jobs for boxes 1 through 3 which Group A controls are established to execute in the user mode, the job is executed in the User 1 mode.

Furthermore, in the event that the group mode of the Group A is changed, the content of the group mode of the Group A stored in the database portion 32 of the authentication server 3 is rewritten. When the user 1 specifies any optional file in boxes 1 through 3 which Group A controls, the group mode after the change is reflected to this file. That is, all the files in boxes 1 through 3 which the Group A controls are subject to the group mode change.

In addition, in the event that the group to which the user 1 belongs is changed from the Group A to, for example, the Group C, the mode control information of the database portion 32 of the authentication server 3 has the user 1 affiliate group changed from Group A to Group C by the system administrator and others. The user 1 is allowed to designate any optional file in boxes 4 through 7 which the Group C controls and is allowed to execute this file in the group mode of the Group C.

Figure 8:
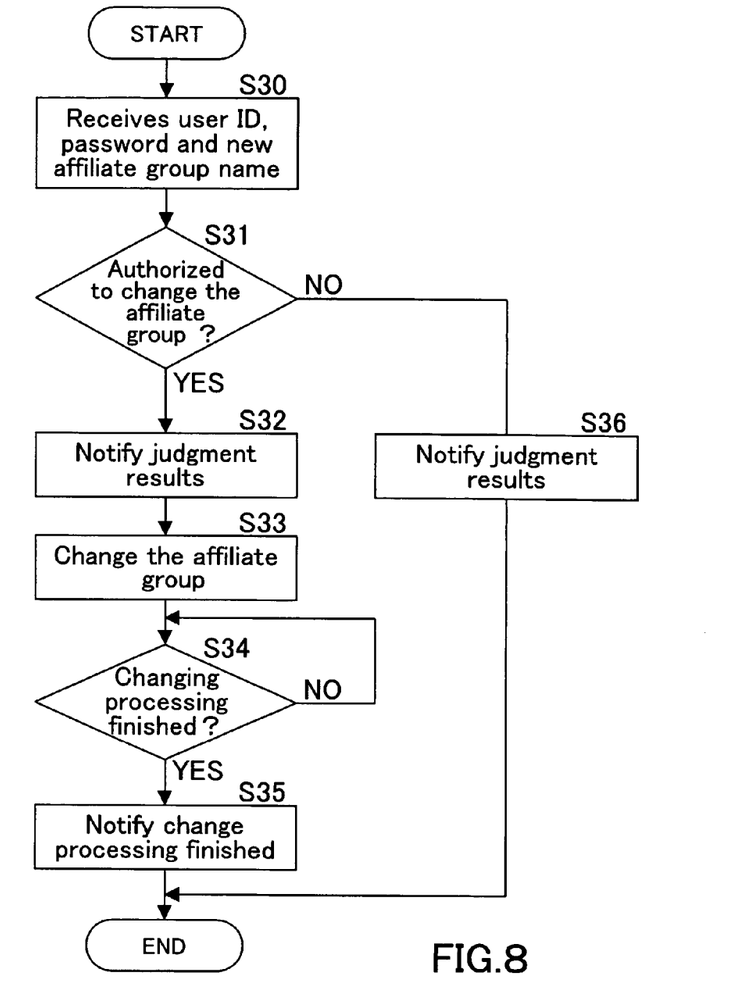
FIG. 8 is a flow chart indicating the content of change processing which the authentication server controller carries out during the affiliate group change operation.

FIG. 8 is a flow chart that indicates processing which the controller 33 of the authentication server 3 carries out when the user 1 affiliate group is changed by the system administrator and others for the mode control information stored in the database portion 32 of the authentication server 3.

The administrator and others enter the user ID, the password, the affiliate group name of the group to which the user newly belongs to the authentication server 3 via the user terminal 2 or operation panel portion 13 of the MFP1.

When in S30, the controller 33 of the authentication server 3 receives the user ID, the password, and the affiliate group name of the group to which the user newly belongs, in S31, it is determined as to whether the administrator and others are authorized to change the affiliate group.

If the administrator and others are authorized to change (YES for judgment in S31), after the judgment results are notified to the user terminal 2 or the MFP1 in S32, the affiliate group for the user stored in the control information is changed in the S33.

Then, it is waited until the change processing is completed in S34 and when the change processing is finished (YES for judgment in S34), in S35, the processing is finished after the effect that the change has been finished is notified to the user terminal 2 or the MFP1.

In the event that the administrator and others have no authority to change the affiliate group in S31 (NO for judgment in S31), the effect is notified to the user terminal 2 or the MFP1, and the processing is ended.

Figure 9:
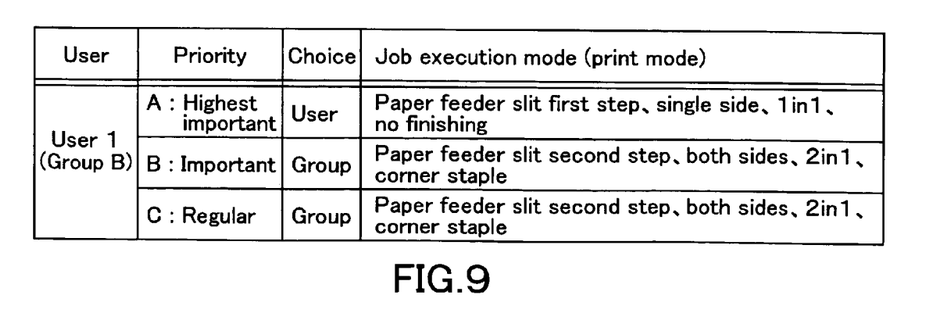
FIG. 9 is an illustration indicating the content of the control information with the job priority established.
Figure 10:
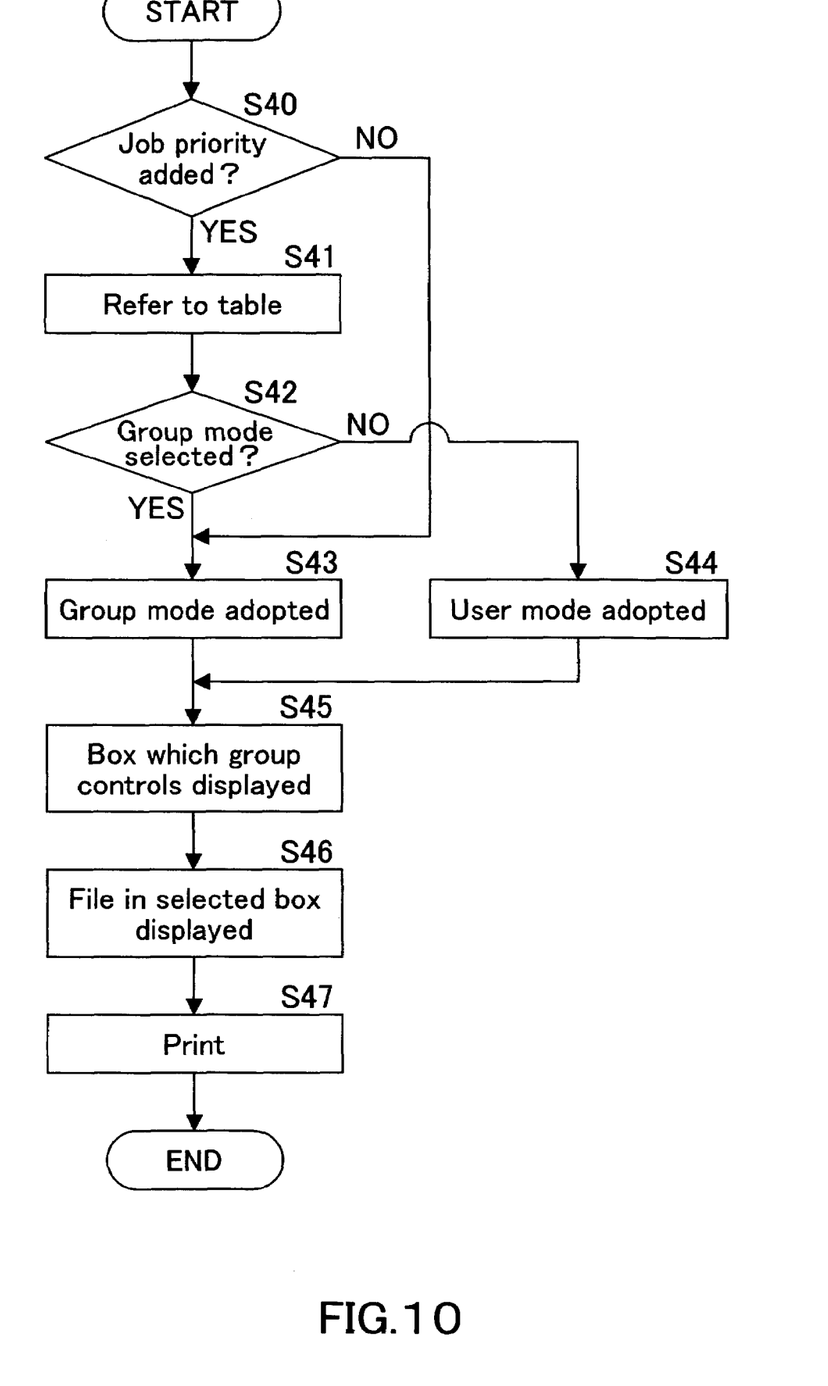
FIG. 10 is a flow chart indicating the content of job execution processing which the MFP controller carries out when the job priority is established in FIG. 9.

FIG. 9 and FIG. 10 explain the other embodiment according to the present invention. In this embodiment, the job execution mode is established in accord with the job priority.

FIG. 9 shows a table of mode control information stored in the database portion 32 of the authentication server 3. In this table, job priorities A through C are established for the user 1 who belongs to the Group B, and for the job of "A: highest importance," the user mode is selected and the specific content of the mode is indicated. For jobs of "B: important" and "C: regular," the group mode is selected, and the specific content of the mode is indicated. If no priority is shown to the job, the group mode is selected.

FIG. 10 is a flow chart that indicates the job execution processing which the controller 16 of the MFP1 carries out after the authentication is succeeded by the authentication server 3 when the user designates the job priority.

To the MFP1, a notice to the effect that the authentication is succeeded and the mode control information of the content of FIG. 9 that indicates the relationship between the user and the job execution mode are sent from the authentication server 3.

In S40, the controller 16 judges whether or not any priority is added to the job directed from the user. If job priority is added (YES for the judgment in S40), in 41, the controller 16 refers to the mode control information transmitted from the authentication server 3, and in S42, judges whether or not the group mode of the affiliate group is selected. If in S40, the job priority is not added (NO for the judgment of the S40), the routine advances to S43 and the group mode is adopted.

In the event that in S42, the priority is "B: important" or "C: regular" in FIG. 9, the group mode is selected (YES for the judgment of the S42). Therefore, after the group mode is adopted in S43, the routine advances to 45. In the event that the priority is "A: highest importance" of FIG. 9 in the S42, the routine advances to S45 after the user mode is adopted in S44 because the group mode is not selected (NO for the judgment of the S42).

In 45, the box which the Group A to which the user belongs controls is displayed on the user terminal 2 or the operation panel portion 13. When the user selects a desired box, files in the selected box is displayed in S46.

When the user designates the desired file in the displayed files, in S47, the file content is printed by the printer portion in the job execution mode adopted, and the job execution processing is ended.

In this embodiment, because the job execution mode in accordance with the job priority is established, the user can execute jobs in the user mode or the group mode in accordance with the job priority, enabling the job to be executed more in line with the actual condition.

Although the invention has been described in one preferred embodiment, it is understood that the present invention is not limited to the above-mentioned embodiment. For example, a case in which the mode control information shown in FIG. 5 or FIG. 9 is stored in the database portion 32 of the external authentication server 3 is shown, but the mode control information may be stored in other external storage portion different from the external authentication server 3 or may be stored in the storage 14 of the MFP1.

In addition, here discussed is a configuration in which the mode control information is transmitted from the authentication server 3 to the MFP1, the group mode of the group to which the user belongs or the user mode about the user is identified by the controller 16 of the MFP1, and the controller 16 of the MFP1 judges which mode, the group mode or the user mode, has been selected, but a configuration that enables the authentication server 3 to judge these pieces of information and notify the judgment results to the MFP1 and enables the controller 16 of the MFP1 to control the job execution in accordance with the information notified may be adopted.

In addition, the authentication server 3 installed outside the MFP1 is used for the authentication apparatus, but the authentication apparatus may be incorporated in the MFP1.

Furthermore, the case is shown, in which the job execution portion of the MFP1 is the printer portion 15, but it may be configured to execute the job by the scan function that delivers files in the box in the form of e-mail, FTP, or others or by facsimile function which transmits files by telephone line. In such event, the group mode or user mode is established with the delivered ends or transmitted ends included.

In addition, the box may be installed not in the MFP1 but in the external server and others.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A job execution system, comprising:
   a job execution apparatus;
   a mode storage portion which is installed outside or inside of the job execution apparatus and stores mode control information that indicates a correspondence of a user with a respective one of a plurality of groups to which the user belongs and a correspondence of the one group with a job execution mode; and
   a mode identification portion which is installed outside or inside the job execution apparatus and identifies the job execution mode based on user information entered by the user for identifying the user and the mode control information stored in the mode storage portion,
   wherein the job execution apparatus is equipped with a job execution portion which executes a job,
   a controller which allows the job execution portion to execute the job directed by the user for execution in the job execution mode identified by the mode identification portion; and
   a plurality of boxes provided at an outside or an inside of the job execution apparatus to store a plurality of files, wherein each of the boxes is assigned to a respective one of the plurality of groups,
   wherein the controller specifies boxes managed by the one group to which the user belongs based on the correspondence between the group and the user for the user to select at least one file among files stored in the boxes assigned to the group, and accepts a selection of the one file.

2. The job execution system as recited in claim 1, wherein the mode control information includes information on the job execution mode established for each user; and the mode identification portion selectively identifies the job execution mode for each user in place of the job execution mode of the group.

3. The job execution system as recited in claim 2, wherein the mode control information includes information on a job priority, and the mode identification portion identifies the job execution mode in accordance with the job priority.

4. The job execution system as recited in claim 1, wherein an authentication portion which authenticates the user is equipped outside or inside the job execution apparatus.

5. The job execution system as recited in claim 4, wherein the controller judges an adequacy of executing the job to the job execution portion based on authentication results of the authentication portion.

6. The job execution system as recited in claim 4, wherein the authentication portion incorporates the mode storage portion.

7. The job execution system as recited in claim 4, wherein user information to be authenticated by the authentication portion is entered from a user terminal through a network.

8. The job execution system as recited in claim 4, wherein the job execution apparatus is equipped with an operation panel portion and the user information to be authenticated by the authentication portion is entered from the operation panel portion.

9. The job execution system as recited in claim 1, wherein the job execution apparatus is an image forming apparatus.

10. A job execution method, comprising:
    receiving user information entered by a user for identifying the user;
    identifying a job execution mode in accordance with the user information entered by the user and mode control information that indicates a correspondence of the user with a respective one of a plurality of groups to which the user belongs and indicates a correspondence of the one group with the job execution mode;
    specifying boxes managed by the one group to which the user belongs based on the correspondence between the group and the user;
    the user selecting at least one file among files stored in the boxes assigned to the group;
    allowing a job execution apparatus to execute a job directed by the user for execution in the identified job execution mode.

11. The job execution method as recited in claim 10, wherein the mode control information includes information on the job execution mode established for each user, and in the identifying of the job execution mode, the job execution mode for each user is selectively identified in place of the job execution mode of the group.

12. The job execution method as recited in claim 10, wherein when any file in a box which stores files is designated, the job concerning the file is executed by the job execution apparatus in the job execution step.

13. The job execution method as recited in claim 11, wherein the mode control information includes information concerning a job priority, and the job execution mode is identified in accordance with the job priority in the identifying of the job execution mode.

14. The job execution method as recited in claim 10, further comprising carrying out user authentication.

15. The job execution method as recited in claim 14, wherein an adequacy of job execution is judged in accordance with authentication results.

16. The job execution method as recited in claim 14, wherein user information to be authenticated is entered from a user terminal through a network.

17. The job execution method as recited in claim 14, wherein the job execution apparatus is equipped with an operation panel portion and user information to be authenticated is entered from the operation panel portion.

18. The job execution method as recited in claim 10, wherein the job execution apparatus is an image forming apparatus.

19. A job execution apparatus, comprising:
    a mode identification portion which identifies a job execution mode in accordance with user information entered by a user for identifying the user and mode control information which indicates a correspondence of the user with a respective one of a plurality of groups to which the user belongs and indicates a correspondence of the one group with the job execution mode;
    a plurality of boxes to store a plurality of files, wherein each of the boxes is assigned to a respective one of the plurality of groups;
    wherein the controller specifies boxes managed by the one group to which the user belongs based on the correspondence between the group and the user for the user to select at least one file among files stored in the boxes assigned to the group, and accepts a selection of the one file;

a job execution portion which executes a job; and a controller which allows the job execution portion to execute the job based on the file selected by the user in the job execution mode identified by the mode identification portion.

20. The job execution apparatus as recited in claim 19, further comprising a mode storage portion which stores the mode control information.

21. An image forming apparatus, comprising:

a mode identification portion which identifies a job execution mode in accordance with user information entered by a user for identifying the user and mode control information which indicates a correspondence of the user with a respective one of a plurality of groups to which the user belongs and indicates a correspondence of the one group with the job execution mode;

a plurality of boxes to store a plurality of files, wherein each of the boxes is assigned to a respective one of the plurality of groups;

wherein the controller specifies boxes managed by the one group to which the user belongs based on the correspondence between the group and the user for the user to select at least one file among files stored in the boxes assigned to the group, and accepts a selection of the one file;

a job execution portion which executes a job; and a controller which allows the job execution portion to execute the job based on the file selected by the user in the job execution mode identified by the mode identification portion.

22. The image forming apparatus as recited in claim 21, further comprising a mode storage portion which stores the mode control information.

* * * * *